United States Patent Office 2,843,551
Patented July 15, 1958

2,843,551

DEFOAMING COMPOSITION

Francis J. Leonard, Woodside, N. Y., and Arthur De Castro, Irvington, and Thomas F. Groll, Jr., Elizabeth, N. J., assignors to Nopco Chemical Company, Harrison, N. J., a corporation of New Jersey No Drawing. Application September 20, 1954
Serial No. 457,292

10 Claims. (Cl. 252—358)

This invention relates in general to antifoaming compositions for general industrial use. More particularly, it relates to new and improved antifoaming compositions for use in the defoaming of latex paint.

The problem of foaming is encountered in many industrial operations, as, for example, in the manufacture of pulp and paper, in the manufacture and use of adhesive materials and in the manufacture and use of latex paints. In the formulation of latex paints the occurrence of foaming reduces the volume of paint which can be handled in a unit and hence lessens the production per unit of apparatus. Foaming can also result in short volume and weight in the paint package. In the application of the paint the entrainment of air during brushing can cause foaming which will result in an uneven and pitted condition on the coated surface. Because the phenomenon of foaming is obviously highly undesirable the development of new and improved defoaming agents has been the object of extensive investigation. While the suitability of a composition for use as a defoaming agent is primarily dependent upon its ability to prevent or to abate the formation of foam, other factors such as the stability of the antifoaming composition, its retention of anti-foaming activity and its ease of formulation must also be considered. Many of the defoaming compositions and agents of the prior art have proven to be unsatisfactory because of their failure to satisfy one or more of these requirements. Thus, many defoamers, while very effective when initially added to a composition to suppress foaming, lose their effectiveness upon standing. The compositions of the present invention are well suited to fulfill the needs of industry for highly effective antifoaming compositions of stable character and are particularly adapted for use in the manufacture and application of latex paints.

It is an object of this invention to provide new and improved antifoaming and defoaming compositions.

More particularly, it is the object of this invention to provide anti-foaming and/or defoaming compositions which are particularly suited for use in the formulation and application of latex paints.

Other objects of the invention will in part be obvious and will in part appear hereinafter.

It has been discovered that the above and other objects may be achieved by the preparation and use of the compositions of the present invention. These compositions comprise a blend of (1) an aliphatic hydrocarbon or mixtures thereof, (2) a fatty acid having from about 6 to about 22 carbon atoms, (3) a polyethylene glycol ester of a fatty acid having a carbon chain length of from about 12 to about 22 carbon atoms, (4) a hydrocarbon soluble organo-polysiloxane and (5) water.

The compositions of the present invention contain an aliphatic hydrocarbon or mixtures thereof as one essential component. The aliphatic hydrocarbons suitable for use in the practice of this invention are liquid in form at room temperature and atmospheric pressure and have a minimum boiling point of at least 150° F. Thus, aliphatic hydrocarbons such as hexane, heptane, octane, paraffin oil, mineral seal oil, white mineral oil, kerosene, naphtha, etc. are examples of some of the hydrocarbons which have been found to be fully suited for use. If desired, mixtures of any two or more of these or other similar hydrocarbons can be employed. In the practice of the invention, the liquid aliphatic hydrocarbon component of the composition comprises from about 40% to about 80% by weight of the novel defoaming compositions. However, the preferred products of this invention will ordinarily contain from about 55% to about 65% by weight of the aliphatic hydrocarbon.

The second component of the novel and improved composition of the present invention comprises a fatty acid having a carbon chain length of from about 6 to about 22 carbon atoms. Either saturated, unsaturated or hydroxylated fatty acids coming within the above definition may be employed. Examples of suitable fatty acids are stearic acid, oleic acid, 12-hydroxy stearic acid, ricinoleic acid, lauric acid, etc. The fatty acid component may comprise from about 10% to about 20% by weight of the defoaming composition. However, in the preferred practice of the invention the fatty acid component will ordinarily comprise from about 13% to about 16% by weight of the finished composition.

The third ingredient of the composition of the present invention comprises a polyethylene glycol monoester of a fatty acid having a carbon chain length of from about 12 to about 22 carbon atoms. The polyethylene glycols from which the ester components of the present invention are prepared are those polyethylene glycols having a molecular weight greater than about 400 and, in general, will comprise those polyethylene glycols having a molecular weight of from about 400 to about 1000. The fatty acids which are used in preparing these esters may be any fatty acids having a carbon chain length of from about 12 to about 22 carbon atoms, including both straight chain or branched chain aliphatic carboxylic acids which may be either saturated, unsaturated or hydroxylated. Examples of some of the esters which are contemplated for use are the monoesters of polyethylene glycol (molecular weight of 400) and lauric, stearic, 12-hydroxy stearic, ricinoleic or oleic acid and monoesters of polyethylene glycol (molecular weight of 600) and lauric, stearic, 12-hydroxy stearic, ricinoleic or oleic acid. The polyethylene glycol ester will ordinarily comprise from about 3% to about 12% by weight of the final product. However, in the preferred embodiment of the invention the defoaming composition will contain from about 5% to about 10% by weight of this ester.

The fourth component of the improved defoaming composition of the present invention is a hydrocarbon-soluble organo-polysiloxane having from 1 to 3 lower alkyl radicals per silicon atom. The lower alkyl radicals include the methyl, ethyl, propyl and butyl radicals. In the preferred embodiment of the invention the siloxanes employed are methyl polysiloxanes having a viscosity of at least 50 centistrokes at 25° C. The polysiloxane component can comprise from about 1% to about 10% by weight of the final product. In the preferred embodiment of the invention the polysiloxane component will comprise from about 2% to about 6% by weight of the final composition.

The final component of the present composition comprises water, used in such proportions as to bring the percentage composition of the final product to a total of 100%.

The novel compositions of the present invention are readily prepared. The sequence in which the various components are admixed does not materially affect the physical or chemical characteristics of the final product.

The components may be blended in any desired sequence or in any suitable combinations. However, regardless of the sequence of steps employed in blending the ingredients, the actual blending will be facilitated if it is carried out at temperatures within the range of about 50° to 100° C. In the preparation of the compositions of this invention the mixture of the ingredients should be well stirred or otherwise agitated in order to insure homogeneity in the final product. It has been found that the preparation of the anti-foaming compositions is facilitated and that the maximum benefits derived from the inclusion of the polysiloxane component in the compositions of the present invention are obtained when the polysiloxane is incorporated in the form of an emulsion. Hence, it is preferred to employ a polysiloxane emulsion in the preparation of the new and improved anti-foaming compositions of the present invention.

Because of the varied processes in which the present compositions can be employed as anti-foaming agents, it is impractical to recite proportions which will adequately cover the particular quantities of the present products which will be required to effectively prevent or suppress foaming in each of the processes in which the present compositions are suitable for use. The quantity which must be employed will be dependent upon several factors in the particular process in which the composition is to be used. Therefore, in specific applications the most suitable amount can be readily determined by those skilled in the particular art in which the composition is to be used. In the formulation of latex paints it has been found that the antifoaming compositions of the present invention can be employed at concentrations of from about 1 to about 5 parts per 1000 parts of the finished paint. In commercial operations, optimum results will be realized when the present compositions are employed at a level of 2 pounds per 100 gallons of latex paint, the latex paints normally having a weight of from about 10 to about 12 pounds per gallon.

The advantages which accrue from the use of the present compositions as defoaming agents are many and varied. The products will be found to be superior antifoaming and/or defoaming agents and their use will also be found to result in increased economies both for the manufacturer and the consumer. Moreover, the characteristics of the present products are such that certain technical improvements in the processes which employ defoaming agents are now possible. In many instances it will be found that the products of the present invention can be added as such to the solution which is to be treated without first being further diluted with additional quantities of water. It will be found that the present products are relatively stable and hence can be stored for a considerable period of time prior to their use in particular applications. Further, the compositions of the present invention contain a relatively minor proportion of water in contrast to many of the defoamers of the prior art which contain large percentages of water.

For a fuller understanding of the present invention, reference should be had to the following examples which are merely illustrative of the invention and are not to be construed in a limiting fashion. All parts given are by weight.

*Example I*

58.0 parts of 28° Bé. paraffin oil, 16.0 parts of stearic acid, 6.0 parts of polyethylene glycol (600) mono-oleate and 10.0 parts of a polysiloxane emulsion were admixed and the resulting solution was heated to a temperature of about 115° F. with thorough agitation. The heating and mixing were continued until all the stearic acid had dissolved and the solution was relatively clear. 10.0 parts of water were added to the solution and the mixture was allowed to cool to room temperature while continuing thorough agitation. The product was a cream colored paste having excellent defoaming properties.

The polysiloxane emulsion used in the preparation of the composition of this example was a 30% aqueous emulsion of a benzene-soluble methyl polysiloxane having a grease-like consistency.

The composition of this example was evaluated for its effectiveness as a defoamer by comparing the rate of foaming of a vinyl chloride-vinylidene chloride latex containing the defoaming composition with that of a vinyl chloride-vinylidene chloride latex which contained no defoamer. The test was carried out as follows: 20 cc. of a commercial vinyl chloride-vinylidene chloride latex (Dow Latex 744–B) containing 12 grams of solids were placed in a 70 ml. graduate. The antiform composition whose preparation is described above was diluted to a 20% concentration by the addition of four parts by weight of water to one part by weight of antifoam composition. A sufficient amount of the diluted antifoam composition was added to the latex in the graduate to provide 1% by weight of the original antifoam composition based on the solids content of the latex. The latex was then agitated for one minute using a 1 disc Gilbert mixer and the foamed volume was recorded at ten second intervals for one minute, at 15 second intervals for a second minute, and at one minute intervals thereafter, or until the foamed volume reached 65 mls. A control was run in which the same procedure was carried out using a second sample of vinyl chloride-vinylidene chloride latex, except that no antifoam agent was incorporated into the second sample. In order to verify the results obtained in this comparative test, a second comparative test was carried out in exactly the same manner. The first and second comparative tests are identified in the chart below by the letters *a* and *b*, respectively. The results of the test procedures are set out in the following chart:

| Time (in secs.) | 0 | 5 | 10 | 15 | 20 | 25 | 30 | 35 | 40 | 45 | 50 | 55 | 60 | 75 | 90 | 105 | 120 | 180 |
|---|---|---|---|---|---|---|---|---|---|---|---|---|---|---|---|---|---|---|
| Foamed Volume, Example I: Composition of— | | | | | | | | | | | | | | | | | | |
| (a) | 22 | 46 | 48 | 49 | 50 | 51 | 51 | 52 | 53 | 53 | 54 | 55 | 55 | 56 | 56 | 56 | 58 | 65 |
| (b) | 22 | 47 | 49 | 49 | 50 | 50 | 51 | 52 | 52 | 52 | 53 | 53 | 53 | 53 | 54 | 55 | 57 | 65 |
| Foamed Volume Control: Composition of— | | | | | | | | | | | | | | | | | | |
| (a) | 21 | 55 | 63 | 65 | | | | | | | | | | | | | | |
| (b) | 21 | 50 | 57 | 62 | 65 | | | | | | | | | | | | | |

These results show that the composition of the present example exerts a very substantial effect in suppressing foaming.

The antifoaming composition prepared above was incorporated into a styrene-butadiene based latex paint and proved very effective in suppressing foaming in the finished paint.

*Example II*

A polysiloxane emulsion was prepared as follows: 1.15 parts of a polyethylene glycol (600) ester of coconut oil fatty acids and 0.13 part of a potassium soap of castor oil were admixed and then dispersed in 16.0 parts of water. 28.9 parts of a dimethylpolysiloxane compound having a viscosity of not more than 500 centipoises at 25° C. were added slowly to the water dispersion with thorough agitation. After all of the polysiloxane had been added, 50.62 grams of water were added and the entire mixture was agitated for about ten minutes. At the end of this period, 3.2 grams of sulfated sperm oil were added and the composition was then homogenized in a colloid mill.

10 parts of the polysiloxane emulsion prepared above were then used in preparing a defoaming composition, using the formulation and procedure employed in the preparation of the defoaming composition of Example I, except that the above-prepared polysiloxane emulsion was used in place of the polysiloxane emulsion used in preparing the composition of Example I. The resulting defoaming composition was incorporated into a butadiene-styrene based latex paint and was found to be very effective in preventing foaming of the paint on application, thereby insuring satisfactory coating performance by the latex paint.

Having described our invention, what we claim as new and desire to secure by Letters Patent is:

1. A defoaming composition consisting essentially of from about 40% to about 80% by weight of a liquid, aliphatic hydrocarbon having a boiling point of at least 150° F., from about 3% to about 12% by weight of an ester of a polyethylene glycol having a molecular weight which is greater than about 400 and an aliphatic carboxylic acid having a carbon chain length of from about 12 to 22 carbon atoms, from about 10% to about 20% by weight of an aliphatic carboxylic acid having a carbon chain length of from about 6 to 22 carbon atoms, from about 1% to about 10% by weight of a hydrocarbon-soluble organo-polysiloxane having from 1 to 3 alkyl radicals per silicon atom, said radicals being selected from the group consisting of methyl, ethyl, propyl and butyl radicals, and the balance of the composition comprising substantially water.

2. A defoaming composition according to claim 1 in which the organopolysiloxane is a methylpolysiloxane having a viscosity of at least 50 centistokes at 25° C.

3. A composition according to claim 2 in which the liquid aliphatic hydrocarbon is a mineral oil having a boiling point of at least 150° F.

4. A defoaming composition consisting essentially of from about 55% to about 65% by weight of a mineral oil having a boiling point of at least 150° F., from about 5% to about 10% by weight of an ester of a polyethylene glycol having a molecular weight which is greater than about 400 and an aliphatic carboxylic acid having a carbon chain length of from about 12 to 22 carbon atoms, from about 13% to about 16% by weight of an aliphatic carboxylic acid having a carbon chain length of from about 6 to 22 carbon atoms, from about 3% to about 6% by weight of a methylpolysiloxane having a viscosity of at least 50 centistokes at 25° C., and the remainder of the composition comprising substantially water.

5. A defoaming composition according to claim 4 in which the polyethylene glycol ester is an ester of a polyethylene glycol having a molecular weight of from about 400 to about 1000.

6. A defoaming composition according to claim 5 in which the polyethylene glycol ester is the polyethylene glycol (600) monoester of oleic acid.

7. A defoaming composition according to claim 4 in which the aliphatic carboxylic acid is stearic acid.

8. A defoaming composition according to claim 4 in which the mineral oil is 28° Bé. paraffin oil.

9. A defoaming composition according to claim 4 in which the mineral oil is mineral seal oil.

10. A defoaming composition consisting essentially of about 58% by weight of 28° Bé. paraffin oil, about 6% by weight of polyethylene glycol (600) monooleate, about 16% by weight of stearic acid, about 3% by weight of a methylpolysiloxane having a viscosity of at least 50 centistokes at 25° C., and the balance of the composition comprising substantially water.

References Cited in the file of this patent

UNITED STATES PATENTS

| 2,052,164 | Buc | Aug. 25, 1936 |
| 2,390,212 | Fritz | Dec. 4, 1945 |
| 2,595,928 | Currie et al. | May 6, 1952 |
| 2,773,041 | Larsen et al. | Dec. 4, 1956 |

FOREIGN PATENTS

| 883,589 | Germany | July 20, 1953 |

OTHER REFERENCES

Ross: Chemical Antifoaming Agents, article in Chemical Industries, May 1949, pages 757 to 759.

Ross et al.: Action of Antifoaming Agents at Optimum Concentrations, article in Industrial and Engineering Chemistry, vol. 43, pages 2520 to 2525, November 1951.